(12) United States Patent
Cargnel

(10) Patent No.: US 8,132,908 B2
(45) Date of Patent: Mar. 13, 2012

(54) ARTICULATED SPECTACLE FRAMES WITH WIRE ASSEMBLED COMPONENTS

(75) Inventor: Roberto Cargnel, Agordo (IT)

(73) Assignee: Greed S.r.l, Rome (IT)

( * ) Notice: Subject to any disclaimer, the term of this patent is extended or adjusted under 35 U.S.C. 154(b) by 72 days.

(21) Appl. No.: 12/744,712

(22) PCT Filed: Nov. 27, 2008

(86) PCT No.: PCT/EP2008/010088
§ 371 (c)(1),
(2), (4) Date: May 26, 2010

(87) PCT Pub. No.: WO2009/068291
PCT Pub. Date: Jun. 4, 2009

(65) Prior Publication Data
US 2010/0302500 A1    Dec. 2, 2010

(30) Foreign Application Priority Data

Nov. 27, 2007    (IT) .............................. BL2007A0028

(51) Int. Cl.
G02C 5/08    (2006.01)
(52) U.S. Cl. ............................ 351/63; 351/119; 351/133
(58) Field of Classification Search .................... 351/63, 351/111, 114, 119, 121, 124, 128, 133, 140, 351/149
See application file for complete search history.

(56) References Cited

U.S. PATENT DOCUMENTS

| | | | |
|---|---|---|---|
| 4,720,186 A | 1/1988 | Douillard | |
| 5,115,540 A * | 5/1992 | Delorme | ......................... 16/228 |
| 5,208,616 A | 5/1993 | Chang | |
| 5,896,185 A | 4/1999 | Huang | |
| 6,048,062 A | 4/2000 | Chow | |
| 6,193,368 B1 * | 2/2001 | George | ......................... 351/114 |
| 2010/0283960 A1 * | 11/2010 | Berdou | ......................... 351/156 |

FOREIGN PATENT DOCUMENTS

| | | |
|---|---|---|
| EP | 0 371 904 | 6/1990 |
| FR | 2 538 921 | 7/1984 |
| GB | 322 297 | 12/1929 |
| GB | 2 437 552 | 10/2007 |
| WO | 95/12140 | 5/1995 |
| WO | 2006/065072 | 6/2006 |

OTHER PUBLICATIONS

International Search Report dated Apr. 27, 2009, from corresponding PCT application.

* cited by examiner

*Primary Examiner* — Huy K Mai
(74) *Attorney, Agent, or Firm* — Young & Thompson

(57) ABSTRACT

An articulated spectacle frame with wire assembled components, the components being able to slide and fold back past each other, when the spectacles are not being worn, characterized by using two lens rims (10, 20) for supporting lenses (1, 2) and being hinged together at their inner ends (13, 22a), and equipped with a joining slot (18, 28) on their outside, for orthogonal housing of components coaxial to each other and forming each of two temples (A), all these components being linked together by a wire (70) passing into each of the components tensioning and connecting them in succession, when the two lens rims are located on the same plane in order to use them, whilst the wire slackens allowing disconnection of the temple components and the loosening of these from the components supporting the lenses, when the rims are rotated against each other.

17 Claims, 4 Drawing Sheets

Fig. 5
Fig. 6
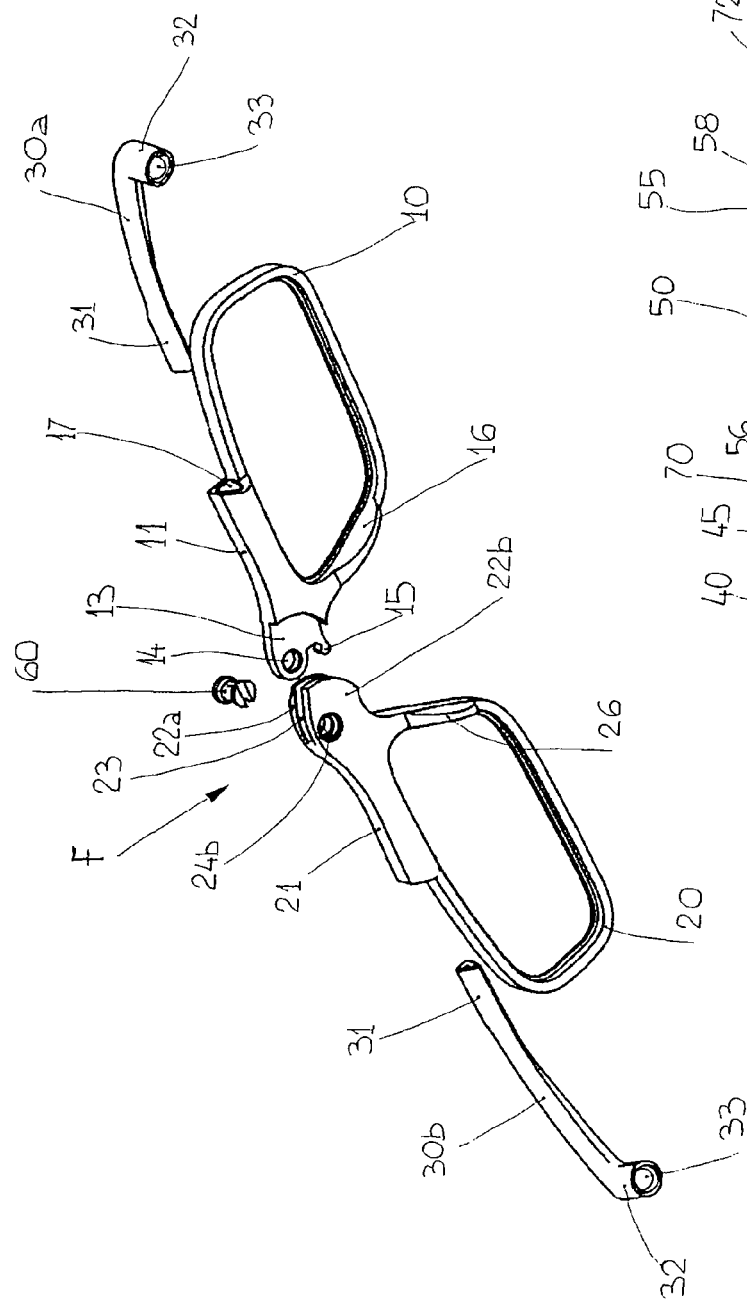
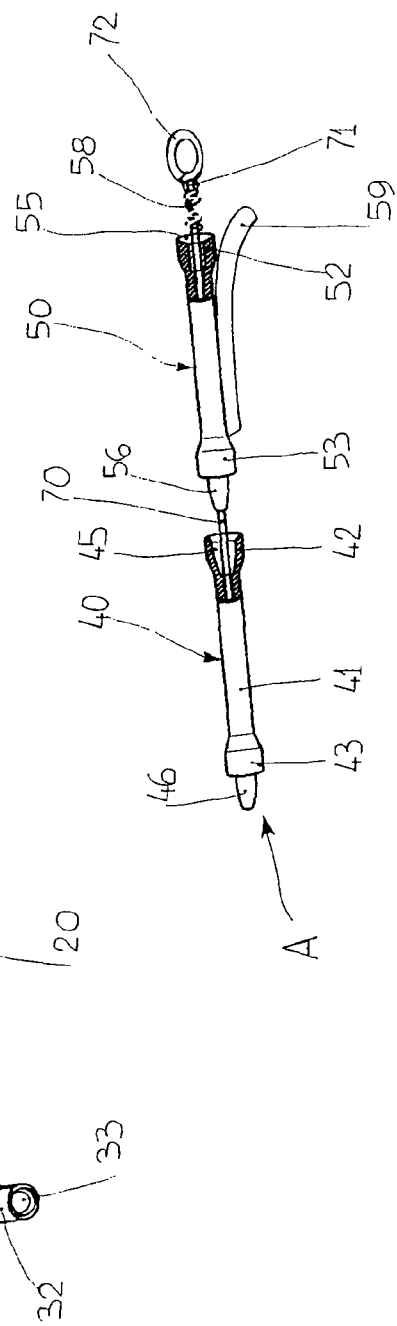

ARTICULATED SPECTACLE FRAMES WITH WIRE ASSEMBLED COMPONENTS

TECHNICAL FIELD

The scope of this innovation is a new type of spectacles using frames with wire articulated components. Said components can slide and fold back past each other, when the spectacles are not being worn for its normal function of visual correction or protection.

BACKGROUND ART

In particular, normal spectacles for long-sighted people are only used when the wearer wishes to focus on nearby objects or figures, whilst generally they are stored away and kept safe in special glasses cases that can be carried in the pocket or put away in special places around the house, so that they can easily be found when needed.

Alternatively, the same normal spectacles for long-sighted people are worn around the neck by the person, using flexible chains or strings, or even with a rigid U-shaped temple, at the two ends of which further lenses can be attached by the long-sighted person, for example magnetically. In all these solutions, however, there is a problem with the overall dimensions of the pair of spectacles, which, because it is used irregularly, always involves problems with storing and locating it, when it needs to be kept safe.

It has been sought to overcome these types of problems with the design of collapsible spectacles, which are less cumbersome, whilst being easy to find, when needed ad hoc.

Among the various solutions mentioned, just for example, one can highlight those proposed with patent Gerald Henry WINGATE No. GB 322.297 filed in 1928, patent Giuseppe RATTI S.p.A. No. FR 2.538.921 filed in 1982, and Antony CHANG U.S. Pat. No. 5,208,616 filed in 1991. These and other corresponding solutions in effect achieve the advantage of controlling the dimensions of the pair of spectacles, when not in use, but the overlapping and folding of several layers of the front-piece components and temple components, mean the folded pair of spectacles are of a significant thickness, which nevertheless creates a problem with safekeeping, for example in a suit pocket.

Moreover, the multiplicity of hinges dividing the components of all these examples of spectacles means a rapid wear of said spectacles, as well as increasing the chance of twisting and deformation due to accidental blows or poor dexterity when unfolding the spectacles, causing them to rapidly become deformed and therefore of little use.

A different form of folding of the temples on the front-piece was proposed with the patent Bugatti S.r.L No. WO 95/12140 filed in 1994, the shape of which allows the temples to retract telescopically, being hinged onto two front-piece lens rims that, in turn, are hinged on the linking bridge.

Although this solution can reduce the thickness of the folded pair of spectacles, there is a considerable complexity in the design and some problems with sliding open and closing the telescopic components of the temples, so much so that it does not appear to be of interest to the market.

A more recent technique was proposed with the patent John Allaway No. GB 2.437.552 filed on 24.04.2006, which prescribes an aerodynamic and rounded front-piece shape, again made up of two lens rim components articulated on the bridge, associated to which are two sections of a temple that is arched and articulated at the front-piece ends, using hinges with a spring that automatic closes it.

This solution too, despite having automatic closing in its favour, appears to be very thick when at rest, also due to the roundedness of the two front-pieces. It is therefore of insufficient interest for the purposes of reducing the size of the spectacles to be stored away, often in a glasses case which is very often not within easy reach whenever said pair of spectacles could be needed for reading or eye protection.

In all these solutions given as examples and numerous other corresponding ones that even the most current technology proposes, the collapsible spectacles at rest always have a rigid structure determined by the presence of the various types of hinge pins or fixed hinged articulations, between the components of the front-piece and the components of the temples; this rigidity always constitutes a risk of breakage due to impact or crushing.

Moreover, precisely due to the inconvenience and size of the collapsible spectacles of every type already known, it cannot be proposed that it be attached around the neck of the person, for example with strings, unless it is kept safe in a special glasses case that ensures an adequate protection from blows.

It is an object of the invention to provide an articulated spectacle frame with wire assembled components that, when not in use, can be worn around the neck, and therefore can easily be found whenever needed for reading or protecting the eyes, without said pair of spectacles having to be of a large size and with a rigid shape when folded, and instead being able to be adaptable and flexible in case of any impact or variation of space available for the person safeguarding it even by carrying it around the neck, such as for example in the case of a motorist who has to wear a seat belt.

TECHNICAL SOLUTION

This object is solved by an articulated spectacle frame with wire assembled components.

Especially, there is provided an articulated spectacle frame with wire assembled components, said components being able to slide and fold back past each other, when the spectacles are not being worn, characterised by the fact of envisaging the use of two lens rims or components for supporting lenses, these components being hinged together, using a fulcrum or hinge of one of their inner ends, and equipped with a joining slot, on their outside, for the essentially orthogonal housing of one or more components coaxial to each other and forming each of two temples. All these components being linked together by a string or wire, which is made to pass into or on each of said components, in order to tension them, thus connecting them in succession, when the two lens rims or components for supporting the lenses are located on the same plane and parallel, in order to allow their lenses to accomplish the visual or protective function, whilst the same linking string or wire slackens and allows the disconnection and slackening of the lateral temple components and the loosening of these from the components supporting the lenses, when said components of the lenses are made to rotate against each other and finish in a folded position or at rest.

Especially, the two lens rims, for supporting the lenses, are hinged together at one of their inner ends, which allows them to articulate on the same plane, and which can bring their corresponding arches or thickening pieces from an aligned coplanar position to a position where they are essentially opposite to that with a coplanar front-piece folded, given that said arches or thickened components have their own longitudinal hole passing beneath their point of articulation, and able to be combined with a corresponding perforated spacer, to allow the string or wire to be slid through that joins together the same lens rims of the front-piece and said spacers to two opposing intermediate lateral perforated sets of components and/or ends; said sets of components and/or act as the temples for said front-piece, when the spectacles need to be used, whilst the same perforated components and/or perforated ends become slack and modular, albeit joined together by the single string or wire, when the spectacles are not being used.

Preferably, one of the lens rims has a thickening piece on its inside or inner end, said thickening piece hosting an eyelet and a lip, a through-hole of said eyelet being placed above an axis of its longitudinal through-hole. Preferably, the other one of the lens rims has a thickening piece on its inside or inner end, said thickening piece hosting a pair of eyelets, separated by a space, as well as a striker slot, the though-holes of said eyelets located above an axis of its longitudinal through-hole. Especially, the through-holes of the eyelets are countersunk on their external surfaces, so that they can host corresponding countersinks of ends and of an elastic hinge pin.

The thickening pieces or components for the hinging and support of the lenses can have a corresponding through-hole coaxial to the polygonal section hole or joining slot, located outside said components. Polygonal section ends of the two opposing spacers can be connected into the holes or joining slots of the thickening pieces, and that said ends have an opposing end angular, especially roughly orthogonal to an axis of the connections, and that said opposing ends have a tapered slot. Especially, passing through the tapered slot is a through-hole running through the whole spacer, which is aligned with the holes of the thickening pieces, when said spacers are housed in their joining slots. Preferably, slotted into the tapered slot of the spacers is a tapered projecting part of the perforated component of the temple, which also has its opposing tapered slot to house the ends of one or more intermediate perforated components of the temple, or to house a tapered projecting part of the perforated end component of the temple, termed a tapered projecting part given that it can be housed directly in the tapered slot of the spacers, if the same temple is made up of a single perforated end component of an especially suitable length. The perforated end component can have the projecting part that can slot into the holes or opposing tapered slot of the intermediate perforated components of the temple and/or into the tapered slots of the spacers, wherein the perforated end component can have, on its opposite side, a slot for an elastic device, and which can have a curved component, that can give the entire temple a better support one the ear of the person wearing the spectacles.

Especially, the string or wire is made to pass and joins together, in an articulated way, parts, especially the perforated end components or the perforated components, of the two temples, to each other and to the corresponding spacers and, passing through the holes of said spacers joins them to the corresponding lens rims, also passing through the holes of their thickening pieces. In such articulated spectacle frame the two ends of the string or wire can have knots or suitable devices for making eyelets, said knots being tied at two different stages in the assembly of the pair of spectacles in question and at a distance equal to the sum of the lengths of the various assembled components, especially not including the pressure on the elastic device. Preferably, inserted or in any case located close to the knots of the string or wire, there can be provided some elastic devices, interposed between the same knots and the ends of the end pieces to ensure the desired stability of the various linked components, when the spectacles are in use.

Especially, when the lens rims are folded around their hinge pin, a distance between the exits points of the thickening pieces is reduced, with a consequent slackening in the traction of the string or wire, such as to allow a slackening in the connections of the various components linked together by the same string or wire.

Especially, the thickening pieces are also linked together by a hinge pin located on a level higher than the level along which the string or wire runs within its housings or longitudinal through-holes, which determines the stability of their connection, also with the aid of a/the lip and striker, and in order to obtain this stability it is necessary to adequately compress the elastic devices. The hinge pin for hinging the thickening pieces can be designed with an axial notch that ensures an elasticised connection in the slots or through-holes of their eyelets or inner ends.

ADVANTAGEOUS EFFECTS

The scope of this innovation is a new type of spectacles using frames with articulated components. Said components can slide and fold back past each other, when the spectacles are not being worn for its normal function of visual correction or protection. Especially, the main innovative feature of this innovation is the use of articulated front-piece lens rims, for supporting the lenses, the lens rims being hinged together, at one of their inner ends which allows them to be articulated on the same plane, and which can take their corresponding arches to a position where they are essentially opposite each other when the front piece is folded, given that said arches have a longitudinal hole passing along a line beneath their point of articulation, and that they can be joined to a corresponding curved and perforated spacer, to allow a wire to be slid through; the wire joins together the same two front-piece lens rims and said curved spacers to two opposing sets of perforated lateral cylinders, acting as articulated temples: one set of lateral cylinders can be aligned to the orthogonal opening of the curved spacer of one lens rim and the other set of lateral cylinders can be aligned to the orthogonal opening of the curved spacer of the other lens rim. The ends of said wire are attached to the ends of both sets of lateral cylinders or temples, by the interposition of an elastic device that can tension the same wire, when the two lens rims are aligned, so that they can be worn by the person, ensuring the desired connection stability of all the components of the articulated spectacle frame. There are countless known structural solutions for collapsible spectacles, generally used in the field of long-sightedness, in which they are a niche, and are all essentially made by hinging a pair of lens rims on their intermediate linking bridge, as well as hinging between them the two sections designed to form the temples of the pair of spectacles, given that obviously the ends of two sections of temple are hinged to the end of the same spectacle front-piece.

Within the aim of this task, another preferred important scope of the innovation is to be able to ensure the spectacles can last a long time, overcoming the problems of friction and wear present in most hinges currently used in every known type of collapsible spectacles.

Another scope of this innovation is to be able to create a pair of articulated spectacles that can be worn around the neck even without the need to resort to rigid or flexible glasses cases, or to rigid temples that in any case increase the dimensions, inconvenience of use and safekeeping of the same current spectacles.

Not least a scope of this innovation is to be able to create a pair of articulated spectacles, which allows the combination of its visual correction function and/or of its function of protecting the eyes, with its aesthetic function when worn, as well as its concealment when the spectacles are not being worn.

These and other aims are in fact perfectly well achieved with this innovation, which, irrespective of the aesthetic form of a model of spectacles to be constructed and its material and workmanship, prescribes the use of the articulated front-piece rims, the lens rims of which are hinged together at one of their internal ends, which allows them to be articulated on the same plane, that can essentially take their corresponding arches to the folded front-piece position, with said arches having a longitudinal hole passing along a line beneath their point of articulation, and able to be joined to a corresponding curved and perforated spacer, to allow a wire to be slid through; the wire joins together the two said front-piece lens rims and said curved spacers to two opposing sets of lateral perforated cylinders, acting as articulated temples. One set of cylinders can be aligned to the external opening of the feed-through hole of the spacer of one lens rim and the other set of cylinders can be aligned to the external opening of the spacer of the other lens rim of the same spectacle frame. The ends of said wire are joined to the ends of both sets of lateral cylinders by the interposition of an elastic device that can tension the same wire, when the two lens rims are aligned, so that they can be worn by the person, ensuring the desired connection stability of the components of the articulated frame.

DESCRIPTION OF DRAWINGS

A better understanding of the new device proposed and a highlighting of the achievement of the aims indicated are described in more detail below and also illustrated, according to a purely indicative and non-restrictive structural form, with the aid of drawings reproduced in the attached tables, including:

FIG. 5 shows a perspective and exploded view, of the inner upper part of the spectacle front-piece, that can be constructed by assembling the components of FIGS. 1 and 2;

FIG. 6 shows a perspective, exploded and partially axial section view, of an articulated temple component in FIG. 3 with a component in FIG. 4, connected to one end of the articulated connection wire;

All the figures are understood to show the same details with the same reference numbers.

Figure 1:
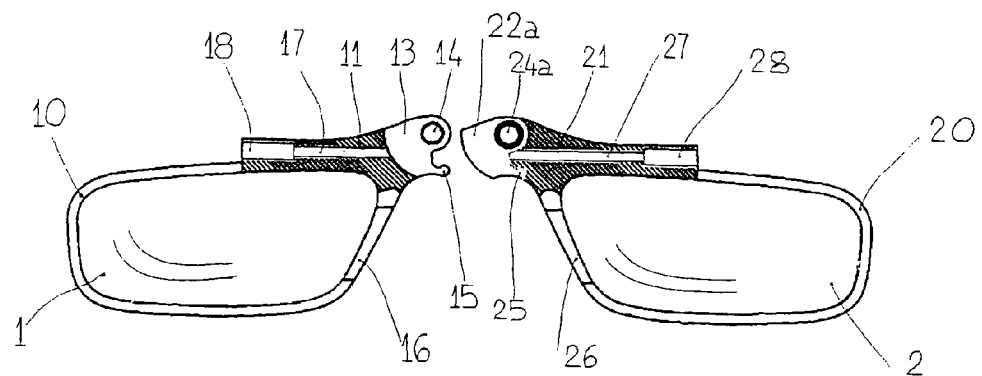
FIG. 1 shows a vertical and partially sectional view, of a pair of lens rims for supporting the lenses of pair of spectacles, said lens rims being seen from the outside of the front-piece and constructed according to the innovation.

According to the structural solution illustrated in the various figures mentioned, a pair of lenses (1, 2), for example of the type for close reading, is housed respectively in lens rims (10, 20) that, according to the illustrated example, are made out of cellulose acetate, to house said lenses (1, 2) by simple pressure on their edges.

The lens rim (10) has an inner end that has a thickening piece (11), with an intermediate projecting part (13) on its thickness, shaped like an eye with a through-hole (14), and has a lower lip (15), as well as another thickening piece (16) acting as a nose rest.

The same thickening piece (11) of the lens rim (10) has a longitudinal through-hole (17), which is situated beneath the position of the through-hole (14) of the eyelet (13) and is attached coaxially to a hole (18) with a polygonal section.

The opposing lens rim (20) also has an inner end with a thickening piece (21), with a pair of eyelets (22a, 22b) separated by an intermediate space (23); said eyelets (22a, 22b) have a through-hole each, respectively (24a, 24b), both preferably countersunk on their external edge.

The intermediate space (23) is completed by the presence of a lower striker slot (25), whilst the same lens rim (20) has a thickening piece (26) acting as a nose rest.

The same thickening piece (21) of the lens rim (20) has a longitudinal through-hole (27), which is situated beneath the position of the though-holes (24) of the eyelets (22) and is attached coaxially to a hole (28) with a polygonal section.

A pair of spacers (30), symmetrical and mirror images of each other (30a, 30b), is associated respectively to lens rims (10, 20) and together make up the front-piece (F) of the articulated spectacles in question, as can be seen in FIG. 5.

Each spacer (30) is essentially made up of an arched component with an end (31) that can be slotted in the spaces (18) or (28) of the thickening pieces (11) or (21) of the lens rims (10, 20), with a polygonal section that is essentially identical to the section of said holes (18, 28).

The opposite end (32) of said spacers (30) is attached roughly orthogonally to the axis of the joining end (31), this position can vary slightly, depending on the shape designed for the front-piece (F).

The same end (32) of the spacer (30) has a tapered slot (33) that also acts as the opening of a through-hole (34) running through said spacer (30) longitudinally, and exits at the end (31).

Figure 2:
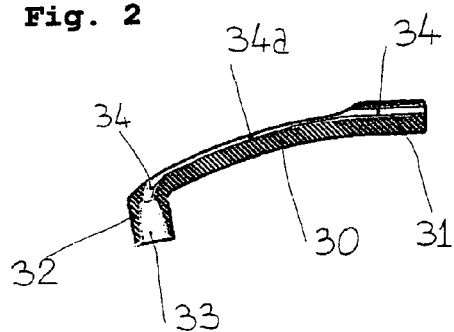
FIG. 2 shows a plan and axial section view of one of the two spacers that can be interposed between each of the two lens rims in FIG. 1, and the end of the articulated temples of FIGS. 3 and 4.

With particular reference to FIG. 2, it can be seen that said hole (34) has an intermediate section (34a) that can be seen on the outside of the spacer (30), for obvious structural reasons but also to give a particular aesthetic effect to the front-piece (F), when the spectacles are worn.

Figure 3:
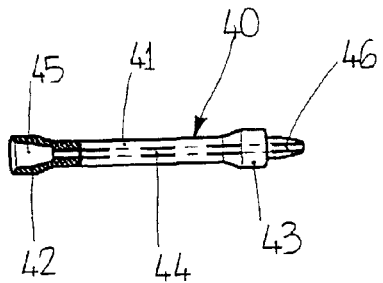
FIG. 3 shows a plan view of a cylindrical section of a pair of spectacles, constituting the initial or joint part of the articulated temple component on the curved end of the spacer in FIG. 2.
Figure 4:
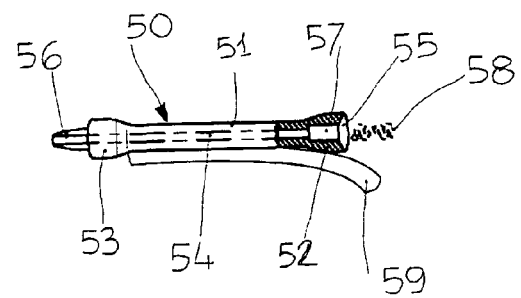
FIG. 4 shows a plan view of a cylindrical section of a pair of spectacles, constituting the end of the articulated temple component.
Figure 7:
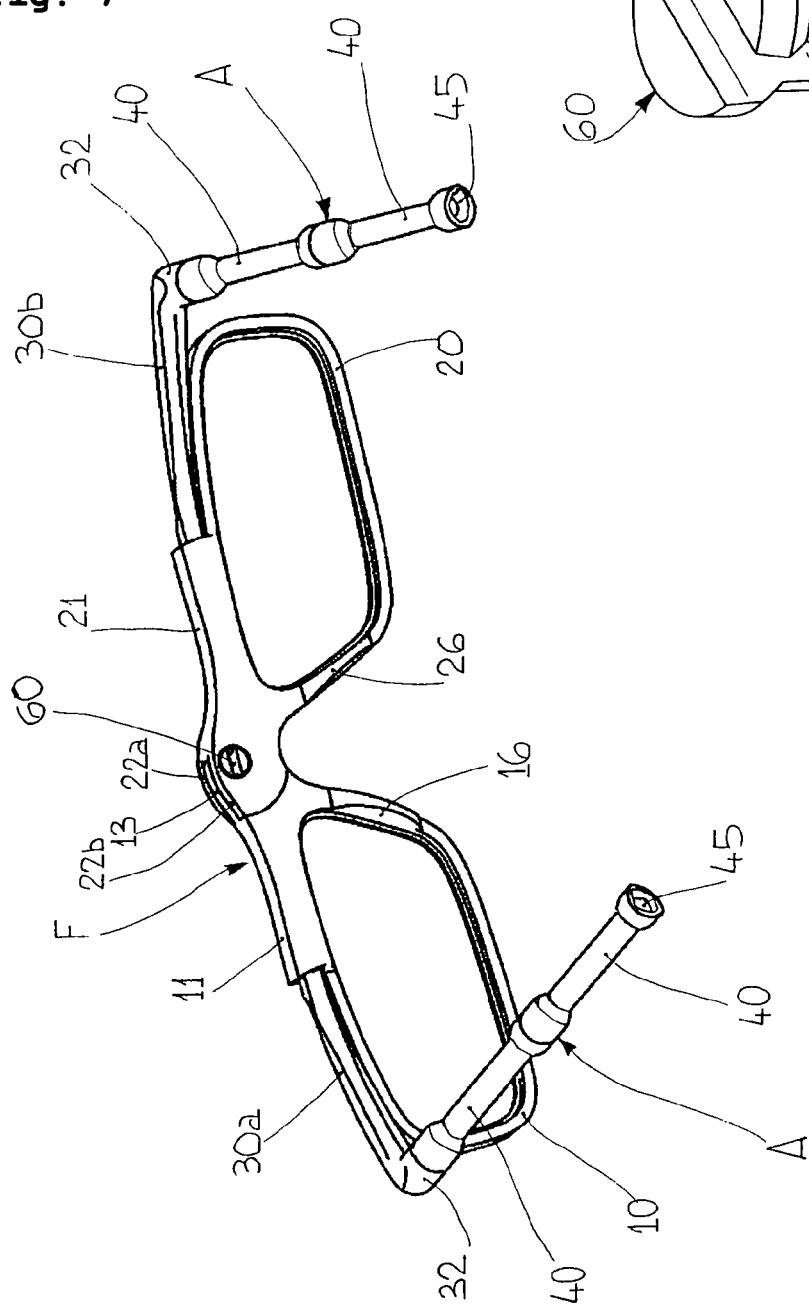
FIG. 7 shows a perspective view of the spectacle components of FIG. 5 and of FIG. 6, linked together by a single wire that allows it to open normally, so that a longsighted person can wear it, for example, when reading.

With reference to FIGS. 3-4 and 6, an illustration is made of a series of perforated cylinders (40, 50), which can be linked together to make up each of the two lateral articulated temples (A), to be joined to the front-piece in FIG. 5, in order to form a pair of reading spectacles like the one given as an example in FIG. 7.

A perforated cylinder (40) is essentially made up of a cylindrical body, for example, (41), with tapered ends (42, 43), that has an axial through-hole (44), as well as a tapered slot (45), located for example on one end (42) and a tapered projecting part (46) located on the opposite end (43).

The same perforated cylinder (40) can be combined and aligned with other identical perforated cylinders (40), in order to form a linear temple (A) of a suitable length, to be interposed between the spacer (30) of the front-piece (F) and the end component (50) of the same temple, given as an example in FIG. 7 and specified in more detail below.

Said end component (50) is again made up of a cylindrical body, for example, (51), with tapered ends (52, 53), that has an axial through-hole (54), as well as a countersink (55) for example on one end (52) and a tapered projecting part (56) located on the opposite end (53).

The countersink (55) of said end piece (50) is coaxial to a slot (57), preferably cylindrical, which is aligned and coaxial to the through-hole (54), and is designed to host an elastic device (58), as specified below.

With particular reference to FIG. 4, one can highlight that joined to the cylindrical body (51) is a possible curved component (59), that can provide said end component (50) with a better support on the ear of the person, in accordance with a technical note.

In order to ensure that said curved component (59) slots in the right position, each time the spectacles are worn, starting from a slack position at rest, owing to a particular structural precaution, the tapered end (56) of said end piece (50) is preferably designed with the lower and higher bases elliptical in shape, for example, rather than circular, just as the slots (45) of the intermediate component (40) will also have corresponding elliptical bases.

Due to this particular shape of the ends (56) of the end piece (50) and of the slot (45) of the intermediate component (40), each time the string or wire (70) is tensioned, as specified in, more detail below, the end piece (50) is forced to slot into the right position, vis-á-vis the intermediate component (40).

Naturally, the protruding end (46) of the same intermediate component (40) must also have a corresponding conical shape with elliptical bases, as must the slot (33) of the spacers (30), in order to ensure the correct alignment of each component of the temple (A), vis-á-vis the front-piece (F) to be worn.

Nevertheless, even designing said ends (56, 46) and said slots (45, 33) with a tapered shape and with a circular base, the position of the curved component (59) of the end piece (50) can easily be adjusted, by rotating it manually until it is in the desired position.

Figure 8:
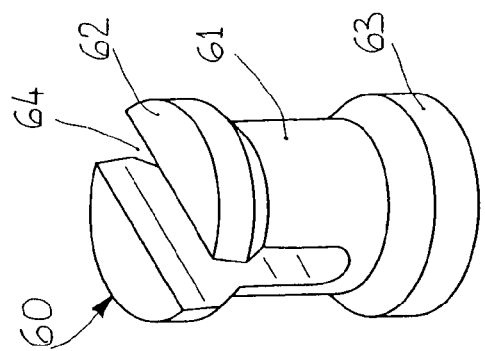
FIG. 8 shows a perspective view of an elastic device hinge pin for the articulated linking of the pair of lens rims in FIG. 1.

The description of the main components making up the articulated spectacles in question, also includes the presence of an elastic hinge pin (60), for the articulated linking of the two lens rims of the front-piece (F), as can be seen in FIGS. 5 and 8.

Said hinge pin (60) is essentially made up of a cylindrical body (61) with two tapered ends (62, 63), ends (62) having an axial notch (64) that also cuts into almost the whole of the central body (61), in order to give the same end (62) adequate elasticity.

With particular reference to FIG. 7, one can highlight, for illustration purposes, the fact that the lens rims (10, 20), can be constructed inverting the hinging components (13, 22), compared to the solution in FIG. 5, just as one could design the temples with a plurality of intermediate components (40) to be joined to the end (50) that is not shown.

Figure 9:
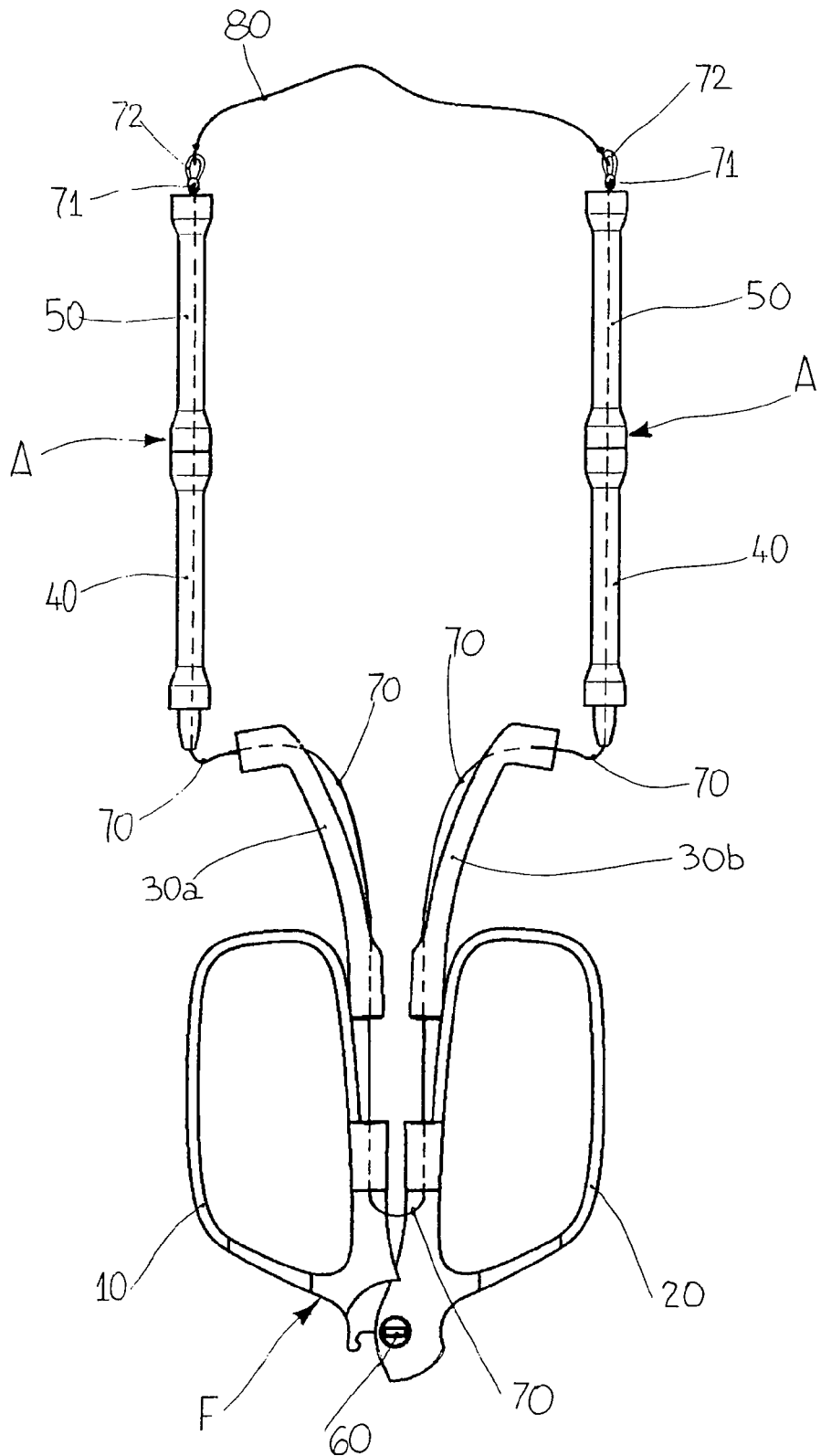
FIG. 9 shows a vertical view of said pair of spectacles in FIG. 7, when at rest.

As can be seen in the same FIGS. 5 and 7, by suitably squeezing the head (62), by acting on its notch (64), the hinge pin (60) is inserted in the holes (14, 24) of the eyelets (13, 22), after the eyelet (13) of the lens rim (10) has been inserted and aligned in the slot (23) of the lens rim (20), so that, its head (62) can widen again in the countersunk slot (24b) of the eyelet (22b), whilst the opposite head (63) can sit in the countersunk slot (24a) of the eyelet (22a), so that the cylindrical central body (61) of said hinge pin (60) is housed by the through-hole (14) of the eyelet (13), in order to allow the lens rim (10) to rotate around the lens rim (20), until its thickening piece (11) overlaps the thickening piece (21) of the lens rim (20), as shown as an example in FIG. 9.

As also indicated by the title of this innovation, the various parts described and illustrated are assembled and made to work by the presence of a string or wire (70) for linking and articulation. With particular reference to FIG. 6, a wire (70) is threaded to an end component (50), after one of its ends has been tied in a knot (71) or other special retainer that can form a head eyelet (72), and after the same wire (70) has been housed in the elastic device (58).

The same string or wire (70) is thus threaded into the through-hole (54) of said end component (50), just as it is threaded into the through-hole (44) of each intermediate component (40), to then be threaded into the through-hole (34) of the adjoining spacer (30), and then in the throughholes (17, 27) of the lens rims (10, 20).

The same free end of the wire (70) is then inserted into the through-hole (34) of the other spacer (30), and then into the through-hole (44) of each intermediate component (40) and into the through-hole (54) of the other end component (50).

Once it has emerged out of the second end component (50), said wire (70) is threaded into another elastic device (58), and then its end is closed with at least one knot (71) and a special eyelet (72).

Clearly threading the wire (70) into the various components indicated above and creating an adequate traction, causes their connection in succession. In fact, gradually pulling the wire (70), forces the projecting part (56) of the end piece (50) to slot into the opening (45) of the adjoining component (40), and so for each other adjoining component (40) until the desired length of articulated temple (A) is formed.

Similarly, the protruding end (46) of the first cylindrical component (40) is slotted into the opening (33) of the first spacer (30b) and its end (31) slots into the holes (28) of the lens rim (20).

By continuing to thread the wire (70) into the other components outlined above and continuing to lightly traction the same wire (70), the eyelet (13) is forced to connect into the slot (23), just as the lip (15) brings itself to rest in its reference striker slot (25), thus creating the possibility of applying the elastic hinge pin (60) that secures the hinging between the two lens rims (10, 20).

By continuing again to thread the other components outlined above, again with suitable tension in the wire (70), the connection of the second spacer (30a) to the lens rim (10) is thus achieved, and thus the connection of the intermediate cylindrical bodies (40) to each other and to the end (32) of the second spacer (30a) and to the end component (50), in accordance with that already described, thus creating a pair of spectacles that is open and ready to be worn, according to the example in FIG. 7.

With reference to FIG. 1, one can highlight the fact that with the connection of the eyelet (13) of the lens rim (10) into the slot (23) between the eyelets (22a, 22b) of the lens rim (20), the holes (17, 27) for the passage of the wire (70) are perfectly aligned, as well as arranged along an axis beneath the axis of the holes (14, 24), in which the hinge pin (60) is applied, with the consequence that, putting the wire (70) under normal traction, the lens rims (10, 20) are perfectly and permanently aligned, in their open or working position, this position also being assisted and delimited by the housing of the lip (15) in its striker slot (25).

At the same time, again due to the desired traction of the string or wire (70) at its ends (71), abutting the corresponding elastic device (58), seated in the holes (57) of the two end components (50), the temples (A) also abut the bent end (32) of the corresponding spacer (30), which, in turn, is seated in the corresponding slots (18, 28) of the two lens rims (10, 20), thus ensuring the maximum stability of the front-piece (F) and of the two temples (A), so that a perfectly functional pair of spectacles can be worn.

It can be seen in particular how the connection of the polygonal ends (31) of the spacers (30) in the polygonal slots (18, 28) of the lens rims (10, 20), ensures the correctness of the pantoscopic angle between the front-piece (F) and the temples (A), for any new shape of spectacles to be worn.

Moreover, the shape of the same ends (31) of the spacers (30) and of the corresponding slots (18, 28) can alternatively be tapered, again for example with elliptical bases, in a similar way to the ends and slots of the intermediate components (40) and end components (50) of the temples (A), as per the above examples.

When the spectacles no longer need to be used, said spectacles are removed from the head of the wearer and, with a slight effort, the lens rims (10, 20) are rotated, always joined together by the hinge pin (60), essentially bringing the corresponding thickening pieces (11, 21) into contact with each other on their external surfaces, rotating the same lens rims (10, 20) on the same plane by about 180o, as shown in FIG. 9.

The moment of maximum effort, when closing the lens rims (10, 20) in the initial stage of rotation, is when the wire (70) has to exceed its minimum distance or dead point, vis-á-vis the position of the hinge pin (60), requiring the compression of the two elastic devices (58) that are attached to the ends (50) of the two temples (A).

Having exceeded said dead point, the wire (70) slackens, withdrawing particularly near the hinge pin (60) and bringing itself to a lower position on the thickening pieces (11, 21), slackening the connections between the parts (50, 40) of the two temples (A), as well as between the same components (40) and the corresponding spacers (30), whilst the same spacers (30) can even remain embedded in their slots (18, 28), just as they can also detach, as shown in the same FIG. 9.

Given the flexibility of the wire (70), it is clear that the various components (30, 40) can in any case be collected together and, for example, stored in a very small container, just as they can be kept in any small space, depending on the main objective proposed.

Again with reference to FIG. 9, it can be seen that, the end hooks (72) can be used for fixing a further length of string (80) that allows the whole set of spectacles to hang around the neck, albeit still in its slack condition, which ensures it occupies a very small space and ensures a lack of risk from blows and pressure, even accidental, despite ensuring the greatest of ease when putting them back together as and when needed, consistent with another of the specific aims. It can now be seen that the total length of the wire (70), or better, the total distance between the two knots (71) of the same string or wire (70) is essentially dictated by the sum of the various lengths of the components of the temple (A) and the front-piece (F), assembled in a working position, as can be seen in FIG. 7.

It is equally clear that one of the two knots (71) must be tied at one end of the wire (70), before starting to thread the various components described above, whilst the other knot (71) can be tied at the opposite end of the same wire (70), after said end has been inserted into all the components described above, including the two elastic devices adjoining said knots (71).

The possibility of designing intermediate components (40) and end components (50) of the temples (A), ensures the spectacles in question can be aesthetically personalised in any way, during its use, just as it allows it to be concealed, when it is simply hung around the neck, given that said intermediate components (40) and end components (50) could be confused for parts of a normal necklace or decorative personal object, without highlighting its function as an aid for long-sightedness, when the spectacles are not being worn, consistent with some other specific aims.

According to a preliminary structural variation, the temples (A) to be joined to the front-piece (F) could even be made up of a single end component (50), to be connected directly to the edges (32) of the spacers (30), just as the same temples could be made up of one or more intermediate components (40), placing the elastic device (58) abutting externally, on the edge (42) of the end component (40) of the temple (A).

According to a further structural variation, which however does not appear to be ameliorative, the elastic device (58) could be eliminated, its elastic properties being replaced by the use of a string or wire (70) equipped with an adequate capacity to react to the stress of opening and closing the eyelets (10, 20) around the hinge pin (60).

The main solution and the variations described above, also allow the possibility of further personalising the articulated spectacles, with the application, at the temples (A) of sheaths, even interchangeable and with different colours or designs.

Naturally, the structural solutions described and illustrated until now are to be deemed, as already specified, purely indicative and not restrictive.

It is possible in fact, for example, to manufacture the lens rims (10, 20) that already have the corresponding spacers (30), for example soldered or in any way fixed to the corresponding thickening pieces (11, 21), just as it is possible to design intermediate components (40) with roughly orthogonal curves, to be joined to spacers (30) or lens rims (10, 20) that have straight joint ends.

Again it is possible to design corresponding solutions for spectacles made out metal, just as it is possible to prescribe the application of the thickening pieces (11, 21) to spectacle frames that do not have closed lens rims but, for example, have the lower part made out of nylon wire, or else it is possible to apply said thickening pieces (11, 21) directly to the lenses (1, 2), making so-called "three piece" spectacles, albeit still articulated.

It is also possible to invert the positions of the spaces (33, 45) and of the projecting tapered parts (46, 56) of the joint components specified above, or to invert the hinging positions between the inner ends (13, 22) of the lens rims (10, 20).

It is also possible to replace the coplanar hinging of the lens rims (10, 20), with a parallel hinging, replacing the vertical hinge pin (60) with a horizontal hinge pin, just as the same hinge pin (60) could also not be elasticated but, for example, made up of a traditional screw closing.

These and other corresponding amendments or adjustments, are understood in any case to be part of the originality of the invention being protected.

The invention claimed is:

1. An articulated spectacle frame comprising:
   wire assembled components, said components being able to slide and fold back past each other, when the spectacle frame is not being worn,
   two lens rims (10, 20) or components configured for supporting lenses (1, 2), these rims or components being hinged together with a fulcrum of one of inner end (13, 22a, 22b) of the rims or components, and equipped with a joining slot (18, 28), on an outside, for an orthogonal housing of one or more components coaxial to each other and forming each of two temples (A), all the components being linked together by a string or wire (70), which is adapted to pass into or on each of said components, in order to tension said components, thus connecting said components in succession, when the two lens rims (10, 20) or components for supporting the lenses (1, 2) are located on a same plane and parallel, in order to allow the lenses (1, 2) to accomplish a visual or protective function, and the linking string or wire (70) slackens and allows disconnection and slackening of lateral temple components and loosening of the lateral temple components from the components supporting the lenses (1, 2), when said components supporting the lenses (1, 2) are made to rotate against each other and finish in a folded position or at rest.

2. The articulated spectacle frame of claim 1, wherein the two lens rims (10, 20), for supporting the lenses (1, 2), are hinged together at one of their inner ends (13, 22a, 22b), which allows the lenses to articulate on the same plane, and which can bring their corresponding arches or thickening pieces (11, 21) from an aligned coplanar position to a position where they are opposite to a coplanar front-piece (F) folded, said arches or thickened components (11, 21) have their own longitudinal hole (17, 27) passing beneath their point of articulation (60), and configured to be combined with a corresponding perforated spacer (30), to allow the string or wire (70) to be slid through that joins together the same lens rims (10, 20) of the front-piece (F) and said spacers (30) to two opposing intermediate lateral perforated sets of components (40) or ends (50);

said sets of components (40) or ends (50) act as the temples (A) for said front-piece (F), while the spectacle frame is in use, while the same perforated components (40) or perforated ends (50) become slack and modular, albeit joined together by the single string or wire (70), when the the spectacle frame is not in use.

3. The articulated spectacle frame of claim 2, wherein one of the lens rims (10) has a thickening piece (11) on its inside or inner end, said thickening piece (11) hosting an eyelet (13) and a lip (15), a through-hole (14) of said eyelet (13) being placed above an axis of its longitudinal through-hole (17).

4. The articulated spectacle frame as of claim 3, wherein one of the lens rims (20) has a thickening piece (21) on its inside or inner end, said thickening piece (21) hosting a pair of eyelets (22a, 22b), separated by a space (23), and a striker slot (25), though-holes (24a, 24b) of said eyelets (22) being located above an axis of its longitudinal through-hole (27).

5. The articulated spectacle frame of claim 4, wherein the through-holes (24a, 24b) of the eyelets (22) are countersunk on their external surfaces, so that the through-holes (24a, 24b) can host corresponding countersinks of ends (62, 63) of an elastic hinge pin (60).

6. The articulated spectacle frame of claim 4, wherein the thickening pieces (11, 21) or components for hinging and support of the lenses (1, 2) have a corresponding through-hole (17, 27) coaxial to the polygonal section hole or joining slot (18, 28), located outside said components (11, 21).

7. The articulated spectacle frame of claim 6, wherein polygonal section ends (31) of the two opposing spacers (30) are adapted to be connected into the holes or joining slots (18, 28) of the thickening pieces (11, 21), and that said section ends (31) have an opposing end (32) angular, roughly orthogonal to an axis of the connections (31), and said opposing ends (32) have a tapered slot (33).

8. The articulated spectacle frame, of claim 7, wherein passing through the tapered slot (33) is a through-hole (34) running through the whole spacer (30), which is aligned with the holes (17, 27) of the thickening pieces (11, 21), when said spacers (30) are housed in their joining slots (18, 28).

9. The articulated spectacle frame of claim 8, wherein slotted into the tapered slot (33) of the spacers (30) is a tapered projecting part (46) of the perforated component (40) of the temple (A), which also has its opposing tapered slot (45) to house the ends of one or more intermediate perforated components (40) of the temple (A), or to house a tapered projecting part (56) of the perforated end component (50) of the temple (A), termed a tapered projecting part (56) given that it can be housed directly in the tapered slot (33) of the spacers (30), if the same temple (A) is made up of a single perforated end component (50) of a predetermined length.

10. The articulated spectacle frame of claim 9, wherein the perforated end component (50) has the projecting part (56) that can slot into the holes or opposing tapered slot (45) of the intermediate perforated components (40) of the temple (A) or into the tapered slots (33) of the spacers (30), wherein the perforated end component (50) can have, on its opposite side, a slot (57) for an elastic device (58), and which can have a curved component (59), that can give the entire temple (A) a better support on an ear of a person wearing the spectacle frame.

11. The articulated spectacle frame of claim 2, wherein the string or wire (70) is made to pass and joins together, in an articulated way, parts, the perforated end components (50) or the perforated components (40), of the two temples (A), to each other and to the corresponding spacers (30) and, passing through the holes (34) of said spacers (30) joins them to the corresponding lens rims (10, 20), also passing through the holes (17, 27) of their thickening pieces (11, 21).

12. The articulated spectacle frame of claim 11, wherein the two ends of the string or wire (70) have knots (71) or devices for making eyelets (72), said knots (71) being tied at two different stages in assembly of a pair of spectacles and at a distance equal to the sum of the lengths of the assembled components (40, 50), and not including pressure on an elastic device (58).

13. The articulated spectacle frame of claim 12, wherein inserted or in any case located close to the knots (71) of the string or wire (70), are a plurality of elastic devices (58), interposed between the same knots (71) and the ends (52) of the end pieces (50) to ensure the desired stability of the linked components, when the the spectacle frame is in use.

14. The articulated spectacle frame of claim 1, wherein when the lens rims (10, 20) are folded around their hinge pin (60), a distance between the exits points of the thickening pieces (11, 21) is reduced, with a slackening in traction of the string or wire (70), to allow a slackening in the connections of the components linked together by the same string or wire (70).

15. The articulated spectacle frame of claim 1, wherein the thickening pieces (11, 21) are also linked together by a hinge pin (60) located on a level higher than a level along which the string or wire (70) runs within its housings or longitudinal through-holes (17, 27), which determines stability of their connection, also with aid of a lip (15) and a striker (25), and in order to obtain the stability it is necessary to compress elastic devices (58).

16. The articulated spectacle frame, of claim 15, wherein the hinge pin (60) for hinging the thickening pieces (11, 21) is designed with an axial notch (64) that ensures an elastic connection in the slots or through-holes (24a, 24b) of the eyelets or inner ends (22a, 22b).

17. The articulated spectacle frame, claim 3, wherein one of the lens rims (20) has a thickening piece (21) on its inside or inner end, said thickening piece (21) hosting a pair of eyelets (22a, 22b), separated by a space (23), and a striker slot (25), the through-holes (24a, 24b) of said eyelets (22) located above an axis of its longitudinal through-hole (27).

* * * * *